Feb. 20, 1962 F. B. KNOX 3,021,794
OIL WELL PUMPING ROD SHOCK ABSORBER
Filed Nov. 12, 1959
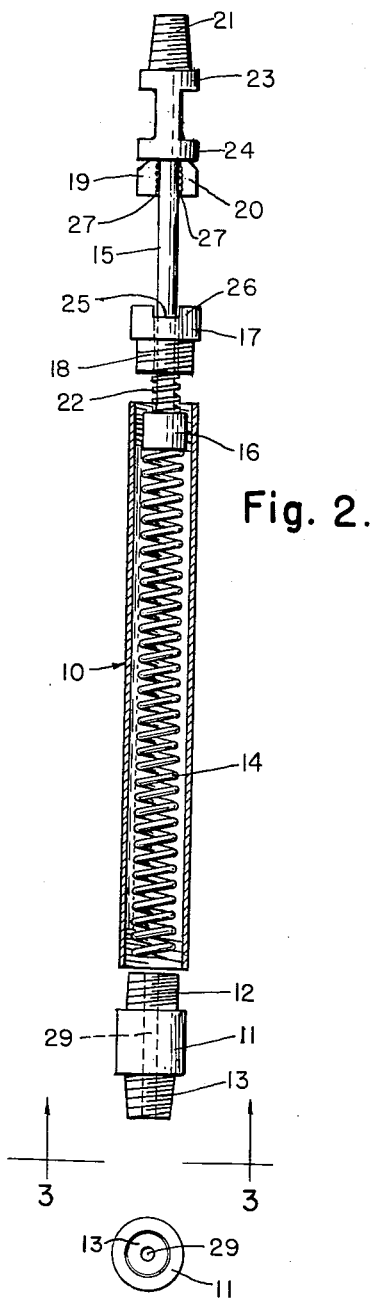
Fig. 2.
Fig. 3.
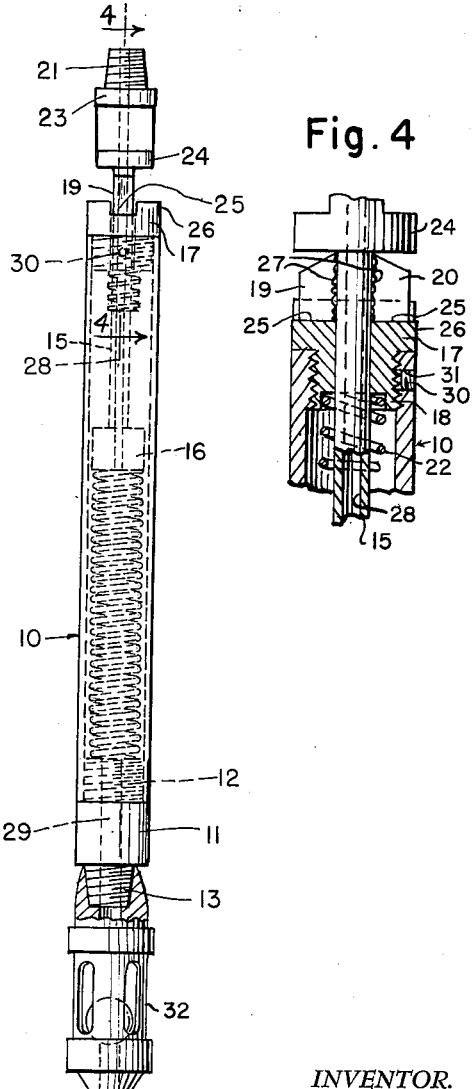
Fig. 1.
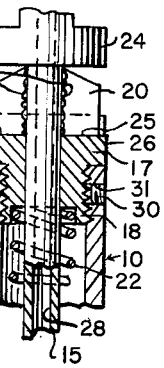
Fig. 4
INVENTOR.
Floris B. Knox
BY Victor J. Evans & Co.
ATTORNEYS

United States Patent Office 3,021,794
Patented Feb. 20, 1962

3,021,794
OIL WELL PUMPING ROD SHOCK ABSORBER
Floris B. Knox, R.D. 4, Robinson, Ill.
Filed Nov. 12, 1959, Ser. No. 852,317
3 Claims. (Cl. 103—202)

This invention relates to oil well pumping equipment, and in particular a shock absorber mounted on the lower end of an oil well pumping rod to eliminate slap, which wears holes in the well tubing or casing.

The purpose of this invention is to provide an oil well rod shock absorber that is readily attached to the lower end of an oil well rod and that prevents shock loads which cause slap and wear holes in the tubing.

In the operation of an oil well pump the fluid stands somewhere in the pumping valve or cylinder causing the well rod to slap in the tubing which results in openings wearing through the walls of the tubing. The slap of the oil well rods also results in unnecessary wear to the rods with the result that the well is in need of repair, and it is necessary to replace both the worn rods and tubing. With this thought in mind this invention contemplates a shock absorbing unit designed to be positioned on the lower end of a well rod whereby the operation of the well rod is smooth and easy and wherein slap and wear resulting therefrom is reduced to a minimum.

The object of this invention is to provide yielding means on the lower end of an oil well pumping rod to prevent slap in the rod in a pumping operation.

Another object of the invention is to provide a shock absorber for the lower end of an oil well pumping rod in which the absorber may be attached to well rods now in use.

A further object of the invention is to provide a shock absorber for an oil well pumping rod in which the absorber is of a simple and economical construction.

With these and other objects and advantages in view the invention embodies an elongated tubular casing having a plug with a threaded nipple extended from the lower end threaded in the lower end of the casing, a plunger positioned in the upper end of the casing, a spring positioned between the plunger and plug in the lower end of the casing, a nut threaded in the upper end of the casing, a shaft extended from the plunger through said nut and having a threaded nipple on the upper end, and a pair of dogs extended from opposite sides of the shaft and arranged to mesh with grooves in the upper end of the nut for coupling the shaft to the standing valve at the bottom of the pumping barrel or cylinder with the spring compressed so that the standing valve can be pulled out of the well.

Other features and advantages of the invention will appear from the following description taken in connection with the drawing, wherein:

FIGURE 1 is a side elevational view of the improved oil well rod shock absorber with the parts shown in contracted positions and with a spring in the absorber shown in compression.

FIGURE 2 is a side elevational view of the oil well rod shock absorber with the parts in extended positions and with a tubular casing of the absorber shown in section.

FIGURE 3 is an end elevational view taken on line 3—3 of FIGURE 2 looking upwardly toward the lower end of the plug in the lower end of the casing of the absorber.

FIGURE 4 is a vertical section through the upper end of the casing and nut threaded therein showing an Allen set screw for retaining the nut in the casing.

Referring now to the drawing wherein like reference characters denote corresponding parts the improved oil well pumping rod shock absorber of this invention includes a tubular casing 10, a plug 11 having a threaded nipple 12 positioned in the lower end of the casing 10 and a depending threaded nipple 13 on the opposite end, a compression spring 14 positioned in the casing, a shaft 15 having a plunger 16 on the lower end positioned with the plunger in the casing and in engagement with the upper end of the spring 14, a nut 17 having a threaded nipple 18 threaded in the upper end of the casing 10, a pair of dogs 19 and 20 positioned on the upper part of the shaft 15, and a threaded nipple 21 extended from the upper end of the shaft 15 and positioned to be threaded into the lower end of a well rod for retaining the absorber on the well rod.

The tubular casing 10 is provided with internally threaded ends and the nipple 12 of the plug 11 is threaded in the lower end of the tubular casing providing a closure for said lower end.

The nut 17 is positioned with the nipple 18 thereof threaded in the upper end of the casing 10 and a relatively small spring 22, such as a three-coil square spring is fastened to the top of the plunger 16 to provide a permanent assembly of the plunger on the shaft.

The shaft 15 is provided with an upper collar 23 that provides a seat at the lower end of the well rod, and a lower collar 24 against the under surface of which the dogs 19 and 20 are positioned whereby the dogs mesh with a transversely disposed groove 25 in the upper end surface 26 of the nut 17. The dogs are secured to the shaft 15, such as by welding as shown at the points 27.

The shaft 15 is provided with a longitudinally disposed bore 28 and a similar passage 29 is extended through the plug 11.

With the parts assembled as illustrated and described the nipple 21 is threaded in the lower end of an oil well pumping rod or last sucker rod and the nipple 13 is attached to the working valve 32. With the parts assembled in this manner the possibility of shock loads being transmitted to the pumping rod is substantially eliminated.

To prevent accidental separation of the parts of the shock absorber in the well an Allen set screw 30 is threaded in an opening 31 in the casing 10 whereby the screw engages the threaded nipple 18 of the nut 17 threaded in the upper end of the casing, as illustrated in FIGURE 4.

The shock absorber of this invention is positioned at the bottom of the last sucker rod and the nipple 13 at the lower end of the shock absorber is connected to the working or standing valve 32 of the oil well assembly.

It will be understood that modifications, within the scope of the appended claims, may be made in the design and arrangement of the parts without departing from the spirit of the invention.

What is claimed is:
1. The combination of a working valve of an oil well rod assembly and an oil well pumping rod shock absorber comprising an elongated casing threaded internally at the ends, a plug threaded in the lower end of the casing, means for attaching the plug to the working valve of the assembly, a shaft extended from the upper end of the casing, a plunger on the lower end of the shaft, a spring positioned on the plunger, a spring in the casing and positioned between the plunger and plug, a nut threaded in the upper end of the casing and having a bore therethrough, said shaft being extended through the bore of the nut so that the lower end thereof is the end on which the plunger is mounted, a threaded nipple on the upper end of the shaft that is adapted to be connected to the rod assembly, spaced collars on the upper part of the shaft, said nut having a groove in the upper end, and dogs extended from the shaft and positioned to mesh with the groove in the upper end of the nut to couple the shaft to the casing for attaching the absorber to a standing valve in the lower end of the well for pulling the standing valve from the well after the working valve has been removed from the well casing.

2. In an oil well pump rod shock absorber, the combination with a working valve of an oil well rod assembly comprising an elongated tubular casing, a closure having a connection for the working valve thereon positioned in the lower end of the casing, a nut having an opening extended therethrough positioned in the upper end of the casing, a vertically disposed shaft slidably mounted in the opening in the nut in the upper end of the casing, a plunger on the lower end of the shaft and positioned in the casing, a spring extended from the opening in the nut to the plunger for urging the plunger downwardly, a spring in the casing and positioned between the plunger and closure in the lower end, a threaded nipple on the upper end of the shaft that is adapted to be connected to the rod assembly, spaced collars on the shaft, said nut having a transversely disposed groove in the upper end, and a pair of dogs extended from the shaft, and positioned to mesh with the groove in the upper end of the nut to couple the shaft to the casing for attaching the absorber to a standing valve in the lower end of the well for pulling the standing valve from the well after the working valve has been removed from the well casing.

3. In a shock absorber for oil well pump rods, the combination with a working valve of an oil well rod assembly comprising an elongated cylindrical casing, the ends of which are threaded internally, a plug having a threaded nipple extended from one end for threading in the lower end of the casing and a threaded nipple extended from the opposite end for attaching the working valve to the casing, said plug having a bore extended longitudinally therethrough, a nut having a bore with a counter-bore therein extended therethrough secured in the upper end of the tubular casing, a shaft extended through the bore of the nut, a plunger carried by the lower end of the shaft and positioned in the tubular casing, a spring positioned between the plug and plunger, a spring positioned between the plunger and nut, the upper end of said spring extending into the counter bore of the nut, spaced collars on the upper end of the shaft, said nut having a transversely disposed groove in the upper end, a pair of dogs extended from opposite sides of the shaft and positioned to mesh with the groove of the nut for coupling the shaft to the casing for attaching the absorber to a standing valve in the lower end of the well for pulling the standing valve from the well after the working valve has been removed from the well casing, a threaded nipple extended from the upper end of the upper-most of said collars whereby said last said nipple is adapted to be connected to the rod assembly, and a set screw threaded through the wall of the cylindrical casing and positioned to engage the nut for preventing accidental displacement of the nut from the casing.

References Cited in the file of this patent
UNITED STATES PATENTS

| | | |
|---|---|---|
| 142,861 | Moloney | Sept. 16, 1873 |
| 1,215,736 | Stafford | Feb. 13, 1917 |
| 1,307,243 | Cousins | June 17, 1919 |
| 1,785,559 | Ponti | Dec. 16, 1930 |
| 2,632,401 | Mong | Mar. 24, 1953 |